United States Patent
Higashino et al.

(10) Patent No.: US 8,642,204 B2
(45) Date of Patent: Feb. 4, 2014

(54) BATTERY PACK WITH COVERING MEMBER AND VEHICLE WITH THE BATTERY PACK

(75) Inventors: Tatsuya Higashino, Yokohama (JP); Kazuo Saito, Yokohama (JP); Toshiyuki Motohashi, Saitama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 340 days.

(21) Appl. No.: 12/937,301

(22) PCT Filed: Apr. 6, 2009

(86) PCT No.: PCT/JP2009/001581
§ 371 (c)(1),
(2), (4) Date: Oct. 11, 2010

(87) PCT Pub. No.: WO2009/128214
PCT Pub. Date: Oct. 22, 2009

(65) Prior Publication Data
US 2011/0027632 A1    Feb. 3, 2011

(30) Foreign Application Priority Data

Apr. 14, 2008 (JP) ................................ 2008-104684
Mar. 2, 2009 (JP) ................................ 2009-048492

(51) Int. Cl.
*H01M 6/42* (2006.01)

(52) U.S. Cl.
USPC ............. 429/149; 429/83; 429/120; 429/148; 180/65.31

(58) Field of Classification Search
USPC ........................ 429/149, 148, 120, 82, 83, 62; 180/65.31
See application file for complete search history.

(56) References Cited

U.S. PATENT DOCUMENTS

| 7,410,722 | B2 | 8/2008 | Iwamura et al. |
| 2008/0187820 | A1 | 8/2008 | Nakano et al. |
| 2009/0220850 | A1 | 9/2009 | Bitsche et al. |
| 2010/0106351 | A1* | 4/2010 | Hanssen et al. ................. 701/22 |

FOREIGN PATENT DOCUMENTS

| CN | 1666359 A | 9/2005 |
| CN | 200976387 Y | 11/2007 |
| JP | 7-320794 A | 12/1995 |
| JP | 2002-151025 A | 5/2002 |
| JP | 2003-187772 A | 7/2003 |
| JP | 2006-236605 A | 9/2006 |
| JP | 2007-12486 A | 1/2007 |
| WO | WO 97/44848 A1 | 11/1997 |
| WO | WO 2006/073071 A1 | 7/2006 |
| WO | WO 2006/108529 A1 | 10/2006 |

* cited by examiner

*Primary Examiner* — Raymond Alejandro
(74) *Attorney, Agent, or Firm* — Foley & Lardner LLP (57) ABSTRACT

A high-reliability battery pack is described. A battery pack has a battery module unit that is formed from a plurality of arranged battery modules, each of which has a plurality of cells in a case, a cooling air flow passage where a cooling air flow flows, and a gas exhaust duct which forms a gas exhaust passage. The gas exhaust duct extends in an arrangement direction S of the plurality of the battery modules while being contiguous to the battery module unit, and takes in the gas released in the case from the cell, then exhausts the gas from the battery module. The gas exhaust duct is provided with a gas inlet for taking in the gas, which communicates with a gas emission hole formed on a surface of the case, and an air intake that serves to take in the cooling air flow.

13 Claims, 11 Drawing Sheets

BATTERY PACK WITH COVERING MEMBER AND VEHICLE WITH THE BATTERY PACK

TECHNICAL FIELD

The present invention relates to a battery pack and a vehicle in which the battery pack is mounted.

BACKGROUND ART

The battery pack has a plurality of arranged cells. The each cell is provided with a valve member that allows gas generated inside the cell to be released. This valve member opens for the release when the gas inside the cell reaches a certain pressure, then the gas is released from the cell. The battery pack also has a gas exhaust passage for taking in the gas released from the each cell and exhausting the gas (see Patent Citations 1 and 2).

CITATION LIST

Patent Literature

PTL 1: Japanese Patent Application Kokai Publication No. 2002-151025
PTL 2: Japanese Patent Application Kokai Publication No. 2006-236605

SUMMARY OF INVENTION

Technical Problem

In the arts disclosed in the patent citations 1 and 2, however, the exhaust of the gas through the gas exhaust passage depends on only the pressure of the gas itself which is released from the cell. For this reason, there is a possibility that when a small quantity of gas is released from the cell, this gas cannot be adequately exhausted.

It is therefore an object of the present invention to provide a high-reliability battery pack that is capable of exhausting the gas even when the quantity of the gas released from the cell is small, and to provide a vehicle with the battery pack which can improve the reliability.

Solution to Problem

A battery pack comprises: a battery module unit having a plurality of arranged battery modules, each of the battery modules has a cell which is housed in a case and provided with a valve member for releasing gas generated in the cell into an inside of the case; a cooling air flow passage which is formed along an outer surface of the case of the battery module and in which a cooling air flow flows; and a gas exhaust duct forming a gas exhaust passage which extends in an arrangement direction of the plurality of the battery modules while being contiguous to the battery module unit for exhausting the gas released in the case from the battery modules. The gas exhaust duct has (a) a gas inlet for leading the gas released in the case into the gas exhaust duct, the gas inlet communicates with a gas emission hole that is provided in the each case to emit the gas; and (b) at least one air intake for taking in the cooling air flow.

A vehicle for attaining the above object is provided with such vehicle-mounted battery pack.

Advantageous Effects of Invention

According to the present invention, the gas can be exhausted through the gas exhaust passage by not only the pressure of the gas itself which is released from the cell but also an air flow that occurs by the cooling wind taken in through the air intakes of the gas exhaust duct. Thus, even when the quantity of the gas released from the cell is small, this gas can be exhausted, then the battery pack with the high-reliability can be provided.

Furthermore, as for the vehicle in which such high-reliability battery pack is mounted, even when the quantity of the gas released from the cell is small, since this gas can be exhausted from the each cell, the vehicle with the high-reliability can be provided.

REFERENCE SIGNS LIST 10 battery pack
10a battery pack
11 battery pack case
12 inlet (opening for the cooling air flow)
13 outlet
14 inlet duct
15 outlet duct
16 air blower 20 cooling air flow passage
21 cooling air flow
30 cell, lithium-ion secondary cell
33 packing such as laminated film
34 valve member
40 battery module
41 case (metal case)
42 gas emission hole
43 cell unit
50 battery module unit
51 end plate
60 gas exhaust duct
60a exhaust opening
61 gas
62 gas inlet
63 air intake
64 inside passage
65 sealing portion
66 thermistor (sensor)
67 air intake
70 frame
80 vehicle
90 covering member
91 door (covering member)
92 rotation shaft
93 connecting rod
94 bracket
95 door (covering member)
100 blower fan
101 motor
102 actuator (drive section)
103 battery controller (control section)
S arrangement direction of the battery modules

DESCRIPTION OF EMBODIMENTS

In the following, embodiments of the present invention will be explained with reference to the drawings.

Figure 1:
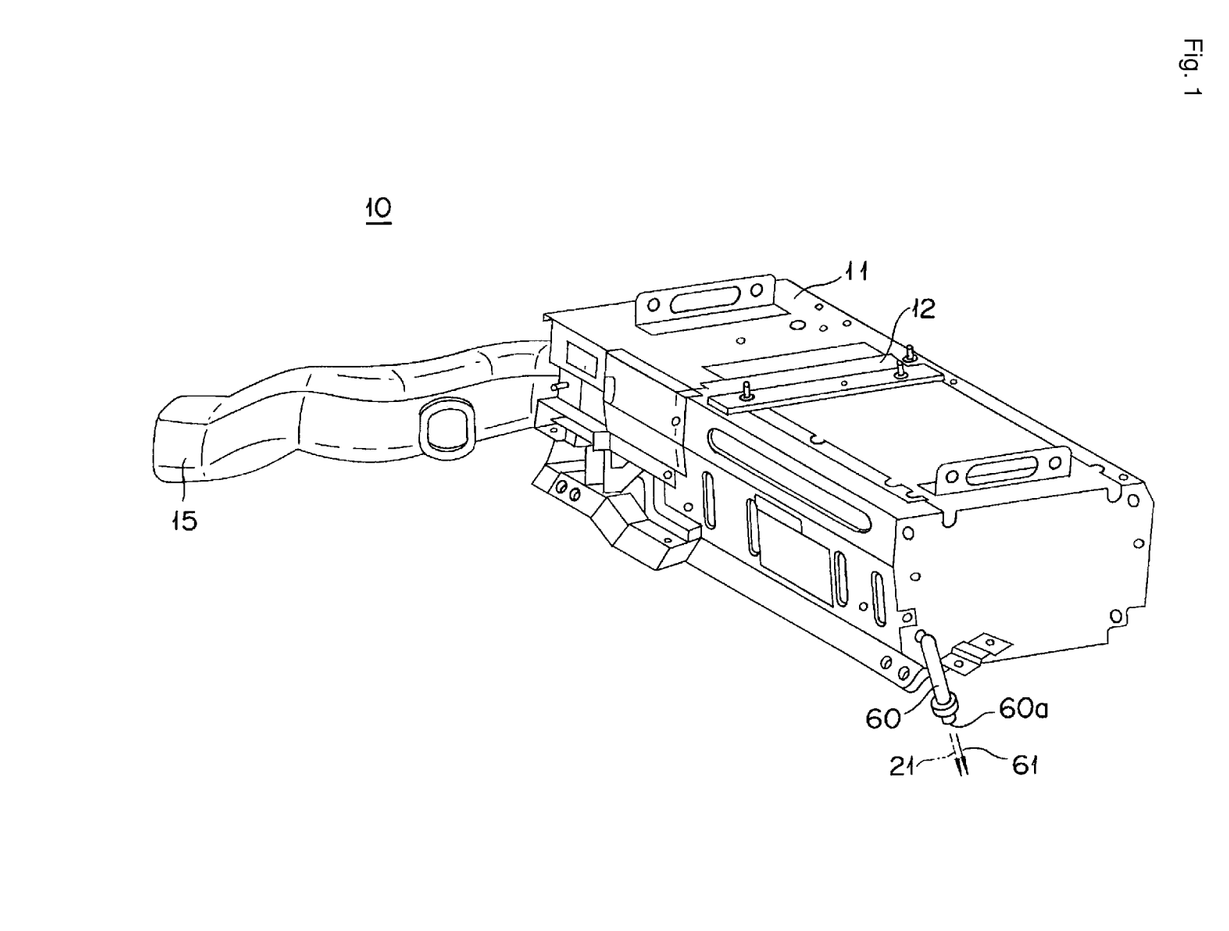
FIG. 1 is a perspective view of a battery pack of the present invention.
Figure 2:
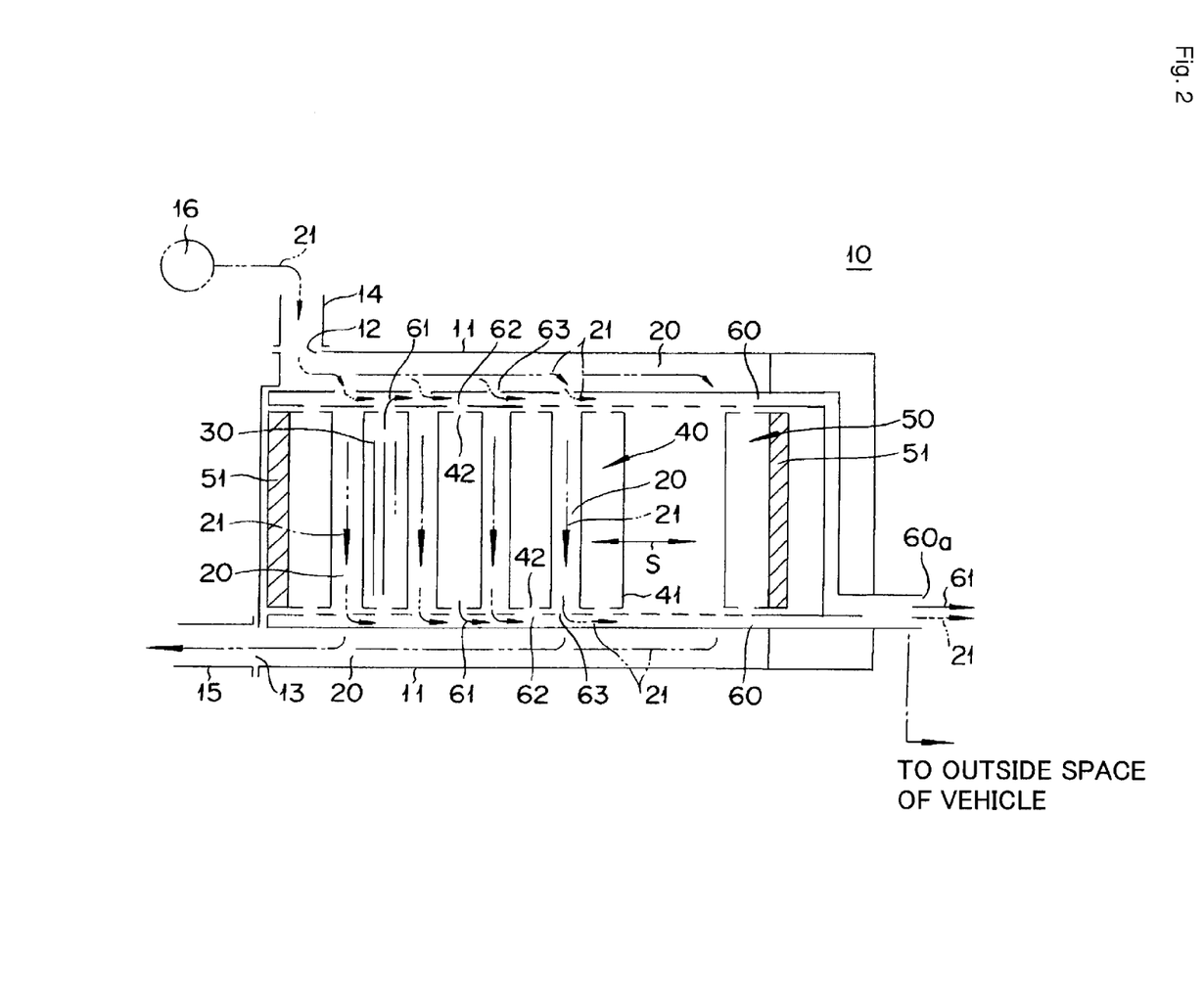
FIG. 2 is a drawing that schematically illustrates a flow of cooling wind or cooling air flow inside the battery pack.
Figure 3:
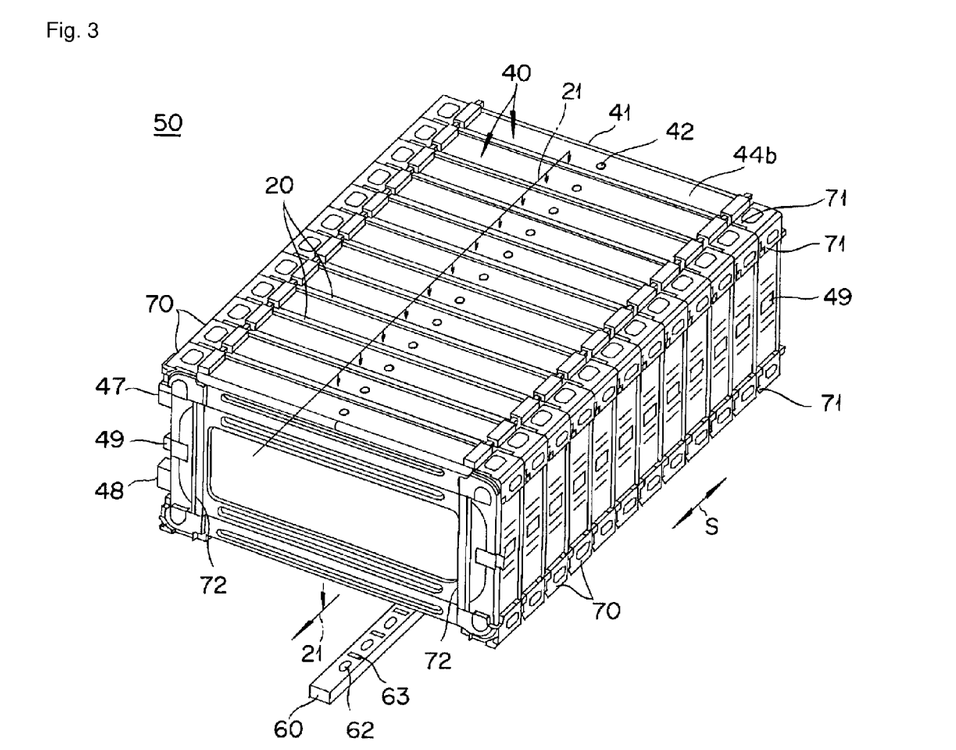
FIG. 3 is a perspective view of a battery module unit that is formed from a plurality of arranged battery modules.
Figure 4A:
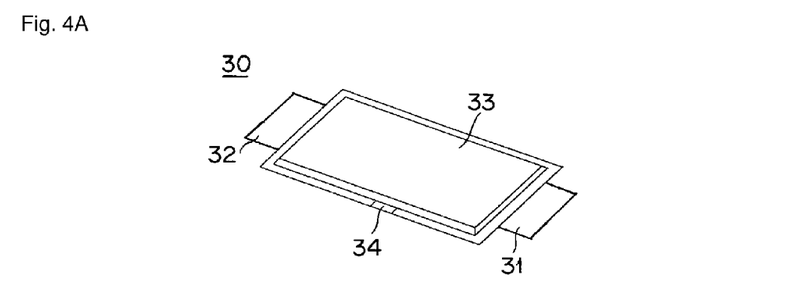
FIG. 4A is a perspective view of a cell of a flat type lithium-ion secondary cell.
Figure 4B:
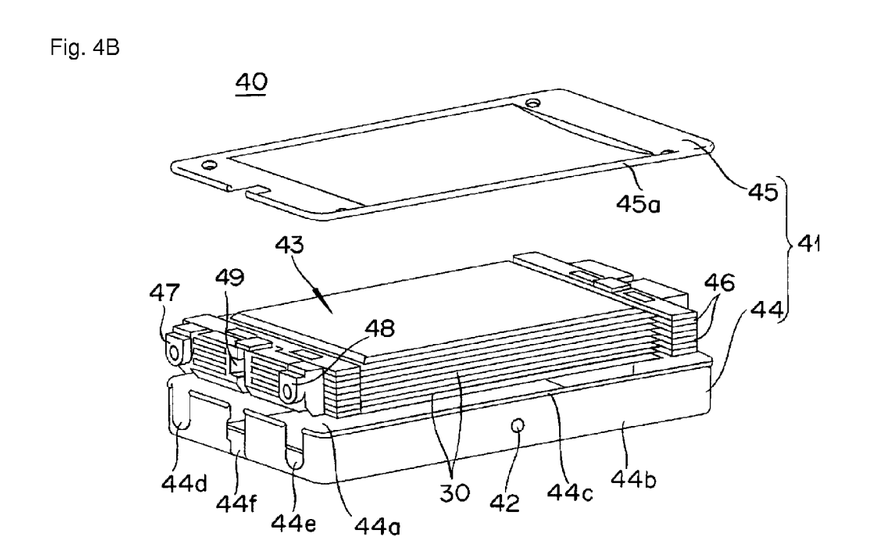
FIG. 4B is a perspective exploded view of the battery module.
Figure 5:
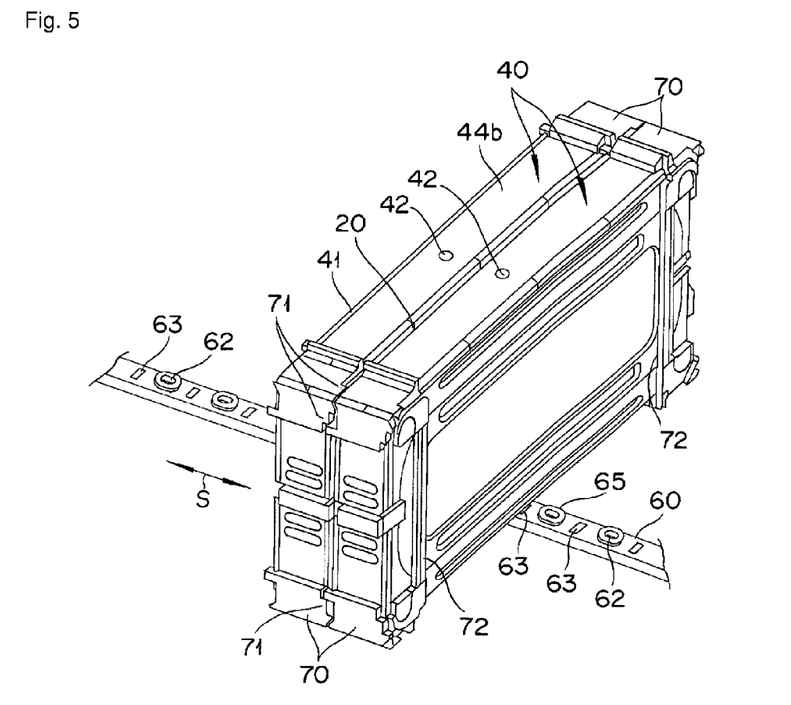
FIG. 5 is a perspective view showing the battery module and a gas exhaust duct.
Figure 6A:
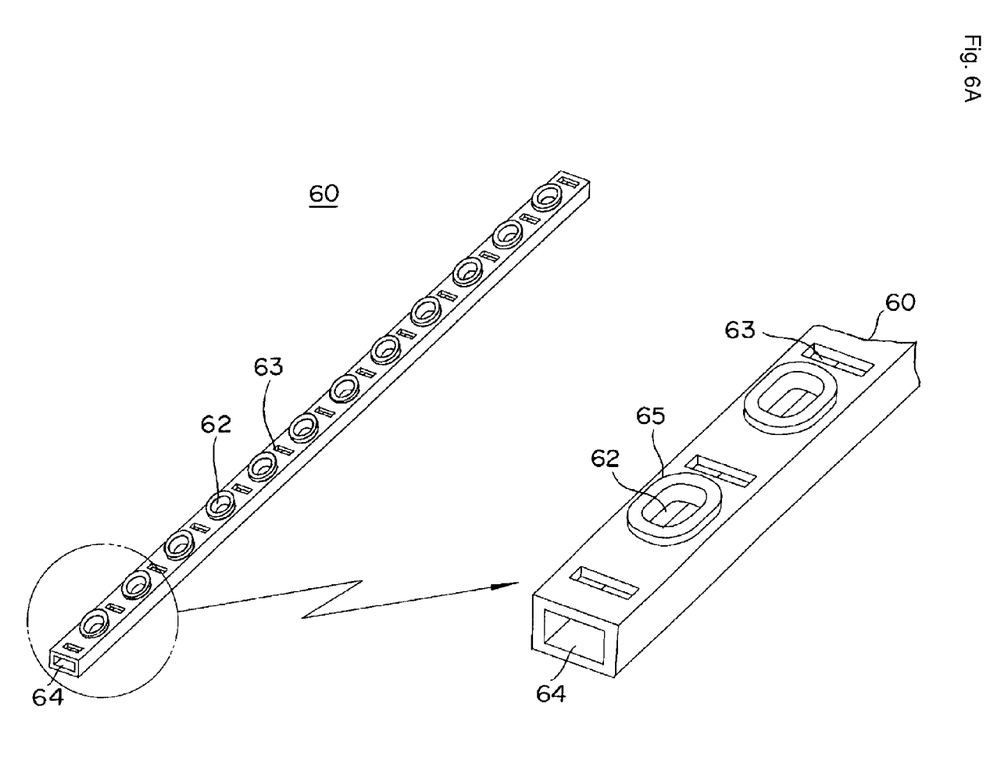
FIG. 6A is an enlarged perspective view of the gas exhaust duct that is arranged on a lower side of the battery pack in FIG. 2.
Figure 6B:
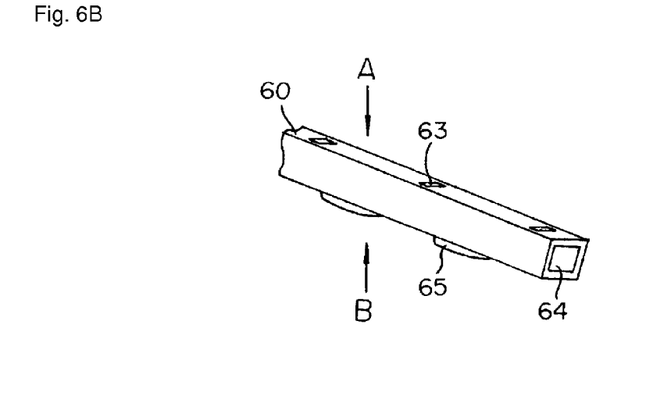
FIG. 6B is a perspective view of the gas exhaust duct that is arranged on an upper side of the battery pack in FIG. 2.
Figure 6C:
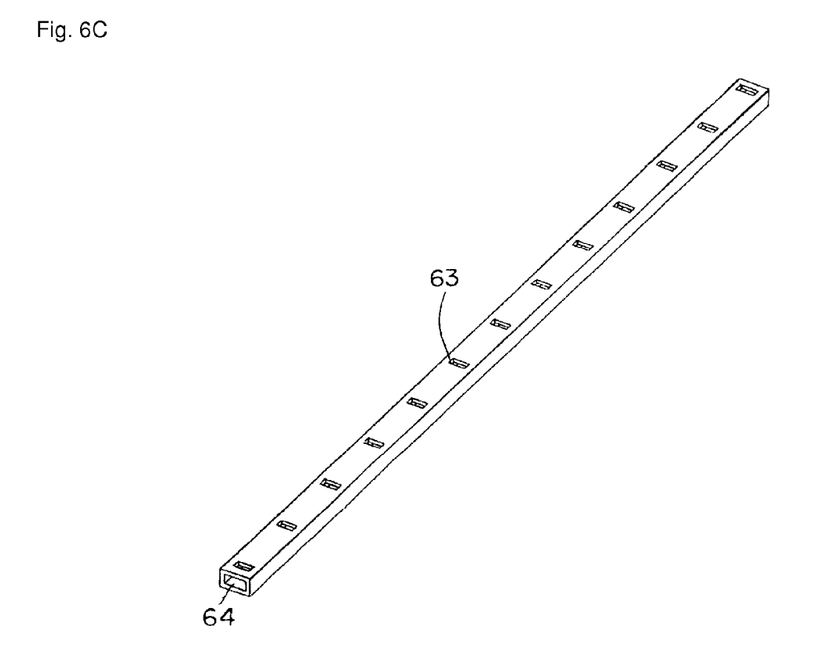
FIG. 6C is a perspective view of the gas exhaust duct, viewed from an arrow A in FIG. 6B.
Figure 6D:
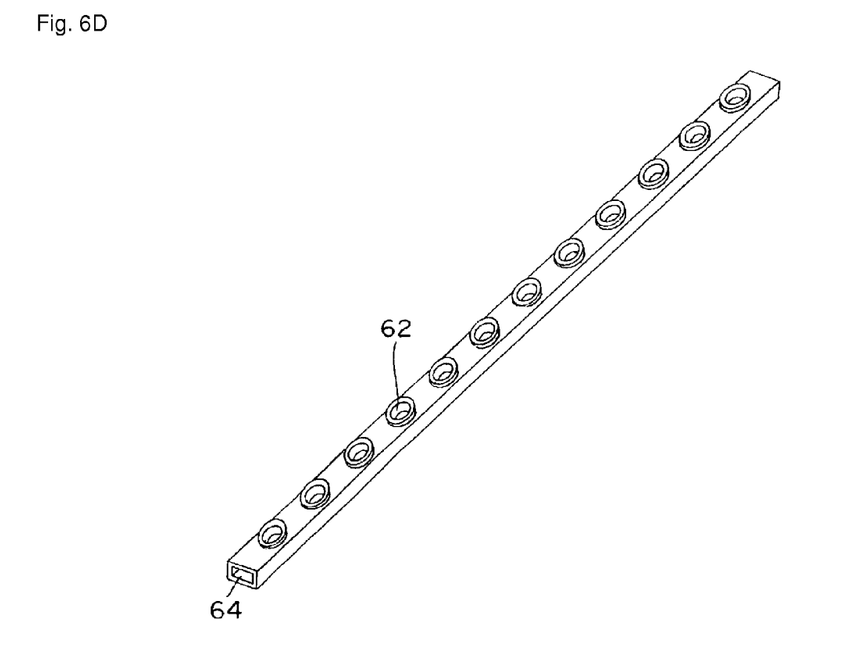
FIG. 6D is a perspective view of the gas exhaust duct, viewed from an arrow B in FIG. 6B.
Figure 7:
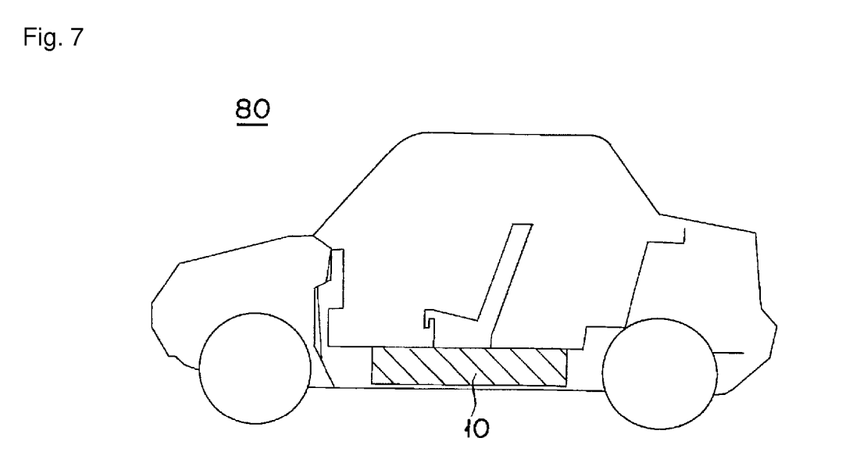
FIG. 7 is a schematic view of a vehicle in which the battery pack shown in FIG. 1 is mounted.

FIG. 1 is a perspective view of a battery pack 10 of the present invention. FIG. 2 is a drawing that schematically illustrates a flow of cooling wind or cooling air flow 21 inside the battery pack 10. FIG. 3 is a perspective view of a battery module unit 50 that is formed from a plurality of arranged or stacked battery modules 40. FIG. 4A is a perspective view of a cell 30 of a flat type lithium-ion secondary cell. FIG. 4B is a perspective exploded view of the battery module 40. FIG. 5 is a perspective view showing the battery module 40 and a gas exhaust duct 60. FIG. 6A is an enlarged perspective view of the gas exhaust duct 60 that is arranged on a lower side of the battery pack 10 in FIG. 2. FIG. 6B is a perspective view of the gas exhaust duct 60 that is arranged on an upper side of the battery pack 10 in FIG. 2. FIG. 6C is a perspective view of the gas exhaust duct 60, viewed from an arrow A in FIG. 6B. FIG. 6D is a perspective view of the gas exhaust duct 60, viewed from an arrow B in FIG. 6B. FIG. 7 is a schematic view of a vehicle 80 in which the battery pack 10 shown in FIG. 1 is mounted.

Referring to FIGS. 1 and 2, the battery pack 10 has the battery module unit 50, a cooling air flow passage 20 and the gas exhaust duct 60. More specifically, as mentioned above, the battery module unit 50 is formed from the plurality of arranged battery modules 40, and the each battery module 40 includes a plurality of cells 30 housed in a case 41 as shown in FIGS. 4A and 4B. The each cell 30 is provided with a valve member (or valve part) 34 (described later) that allows gas 61 generated inside the cell 30 to be released. As for the cooling air flow passage 20, it is formed along an outer surface of the case 41 of the battery module 40, and the cooling air flow 21 flows along the cooling air flow passage 20. With regard to the gas exhaust duct 60 which forms a gas exhaust passage, the gas exhaust duct 60 takes in the gas 61 released in the case 41 from the cell 30, this gas is then exhausted from the battery module 40 through the gas exhaust duct 60. The gas exhaust duct 60 extends in an arrangement direction S of the plurality of the battery modules 40 while being contiguous to the battery module unit 50. As shown in FIG. 2 and other drawings, the gas exhaust duct 60 is provided with gas inlets 62 and at least one air intake 63 (or an air opening 63 for air intake). The gas inlet 62 communicates with a gas release or emission hole 42 that is formed on a surface of the case 41 to emit the gas 61 released in the case 41 from the case 41. The air intake 63 serves to take in the cooling air flow 21. In the present invention, the air intake 63 of the gas exhaust duct 60 opens toward the cooling air flow passage 20 and takes in some cooling air flow 21. Then the cooling air flow 21 taken in through the cooling air flow passage 20 brings about the air flow in the gas exhaust passage (the gas exhaust duct 60).

Referring to FIG. 2, the battery pack 10 is a vehicle-mounted battery that is mounted in the vehicle such as an automobile and an electric train, and the plurality of the battery modules 40 are accommodated in a battery pack case 11 of the battery pack 10. An inlet 12 is formed on an upper surface of the battery pack case 11 for supplying the cooling air flow 21, while an outlet 13 is formed on a side surface of the battery pack case 11 for exhausting the cooling air flow 21. An inlet duct 14 is connected with the inlet 12, and an outlet duct 15 is connected with the outlet 13. Furthermore, the inlet duct 14 is connected to an air blower 16 that is equipped with a fan and a fan-driving motor etc. The cooling air flow 21 supplied through the air blower 16 then flows into the battery pack case 11 via the inlet duct 14.

Any number of battery modules 40 can be connected in series-parallel, thus the battery pack 10 is adaptable to desired current, voltage and capacity. In the case of the series-parallel connection (or the serial-parallel connection) of the battery module 40, proper connecting parts such a busbar are used. The battery modules 40 are spaced such a distance that the cooling air flow passages 20 can be formed between the battery modules 40. The battery module unit 50 is then formed by this arrangement of the plurality of battery modules 40. The battery module unit 50 shown in FIG. 3 has twelve stacked battery modules 40. More specifically, the plurality of the battery modules 40 are arranged in the arrangement direction S and secured. As shown in FIG. 2, for instance, end plates 51 are provided on both sides in the arrangement direction S, of the battery module unit 50, and by connecting the both end plates 51, the battery modules 40, which are sandwiched between the both end plates 51, are held and secured.

The battery module 40 is an air-cooled battery module, and as described above, a space between the battery modules 40 is used as the cooling air flow passage 20 where the cooling air flow 21 to cool down the each battery module 40 flows. The cooling air flow 21 flows along a lateral direction of the battery module 40 in the cooling air flow passages 20. By providing the flow of the cooling air flow 21 in the cooling air flow passages 20 and cooling down the battery modules 40, a temperature of the battery module 40 can be lowered, and deterioration in characteristics such as charging efficiency is prevented. A clearance of the space between the battery modules 40, i.e. a width of the cooling air flow passages 20, is limited or maintained by a frame 70 that is fixed to the battery module 40. The clearance between the battery modules 40 is determined with consideration given to an installation layout of the battery module 40 in the vehicle and dimensions required to function as the cooling air flow passage 20.

The frame 70 is formed from resin material, and is detachably fixed to the case 41 of the battery module 40. The frame 70 has a connecting portion 71 for coupling the adjoining battery modules 40 together. Through the coupling of the adjoining battery modules 40 via the connecting portion 71, a position of the each battery module 40 is fixed, and also the width of the cooling air flow passages 20 is determined. The frame 70 is further provided with a division wall 72 that serves to prevent a leakage of the cooling air flow 21 in a longitudinal direction of the battery module 40.

Referring to FIGS. 4A and 4B, the battery module 40 is a unit for assembling the battery pack 10, and a cell unit 43 having the plurality of electrically-connected cells 30 (e.g. eight cells 30 in the drawing) is housed in the case 41 of the battery module 40. Here, although it can be said that the battery module 40 is a kind of battery pack from a point of view where the battery module 40 has the plurality of electrically connected cells 30, in the present specification, the battery module 40 is the unit for assembling the battery pack 10, and the unit formed by the cells 30 housed in the case 41 is called battery module.

The case 41 has a lower case 44 and an upper case 45. The lower case 44 is formed into a box shape and has an opening 44a. The upper case 45 is a cover that closes the opening 44a of the lower case 44. The upper case 45 has an edge portion 45a, and the edge portion 45a is crimped or rolled up to be secured to an edge portion 44c of a surrounding wall 44b of the lower case 44, then the lower and upper cases 44 and 45 are fixed together by crimping. The lower and upper cases 44 and 45 are formed from a relatively thin steel sheet or an aluminum plate, and a desired shape can be provided by pressing.

The case 41 is a metal case, thus ensuring rigidity or solidity required to support weight of an assembly of the cells 30 and also contributing to downsizing (size reduction) and weight reduction of the battery module 40. In addition, it is possible to adequately resist temperature and pressure of the gas 61 released from the cell 30. Furthermore, since the metal material has high thermal conductivity, a cooling performance of the battery can be improved.

The cell unit 43 has an insulating spacer 46 used for supporting electrode tabs 31 and 32 of the cell 30, and positive and negative output terminals 47 and 48. As shown in FIG. 4B, the positive and negative output terminals 47 and 48 are respectively inserted or fitted into cut portions 44d and 44e which are formed on part of the surrounding wall 44b of the lower case 44. The positive and negative output terminals 47 and 48 protrude outside the case 41 or are uncovered through the cut portions 44d and 44e. In FIG. 4B, a reference sign 49 denotes a plug or insertion hall for receiving a connector (not shown) that is connected to a voltage detection terminal (not shown) for the cell 30. This insertion hall 49 is also uncovered through a cut portion 44f that is formed on the part of the surrounding wall 44b.

Referring to FIG. 4A, the cell 30 is, for instance, the flat type lithium-ion secondary cell. The lithium-ion secondary cell is small and has high performance, thus this results in size reduction of the battery pack 10 and space-saving, and is favorable for improvement of the performance of the battery pack 10, such as high power and long lifetime.

In the lithium-ion secondary cell, a stacked power-generating element (not shown) in which positive and negative electrodes (or plates) and a separator are stacked in order is sealed with a packing 33. The packing 33 is formed from a pair of flexible laminated films etc. As can be seen in FIG. 4A, each of the positive and negative sheet-shaped electrode tabs 31 and 32 whose one end is electrically connected with the power generating element, comes out from the packing 33 of the cell 30. That is, the electrode tabs 31 and 32 extend from both sides of the cell 30 respectively in a longitudinal direction. Here, the flat cell having the stacked power-generating element is required to press down or hold the power-generating element by pressurizing in order to ensure a uniform distance between the electrode plates and to maintain the cell performance. Therefore the cell 30 is housed in the case 41 so that the power-generating element is pressed down.

The cell 30 is provided with the valve member 34 that allows the gas 61 generated inside the cell 30 to be released when the gas 61 reaches a certain pressure. The valve member 34 is provided in a position where the pair of the laminated films are heat sealed. In FIG. 4A, the valve member 34 is positioned at a substantially mid position in the longitudinal direction, of an outer periphery portion where the pair of the laminated films are heat-sealed. The valve member 34 releases the gas 61 from the cell 30 by opening a heat sealed part of the laminated films when the gas 61 generated inside the cell 30 reaches the certain pressure.

The case 41 is provided with the gas emission hole 42 for emitting or releasing the gas 61, which is released inside the case 41 through the valve member 34, from the case 41. As shown in FIG. 2, the gas emission holes 42 are provided on both opposite surrounding walls 44b which extend in the longitudinal direction of the case 41. More specifically, the gas emission hole 42 is positioned at a substantially mid position in the longitudinal direction, of the surrounding wall 44b, and the gas emission hole 42 and the valve member 34 of the cell 30 almost face each other.

Referring to FIGS. 3 and 5, the gas exhaust duct 60 extends in the arrangement direction S of the battery modules 40 while being contiguous to the battery module unit 50. In FIGS. 3 and 5, only the lower side gas exhaust duct 60 is shown, the upper side gas exhaust duct 60 is not shown. In the present invention, as explained above, the gas emission holes 42 are provided on both surrounding walls 44b of the lower case 44, thus the two gas exhaust ducts 60 are provided on the upper and lower sides respectively so that the two gas exhaust ducts 60 are contiguous to the each surrounding wall 44b of the lower case 44 (see FIG. 2). The each of the gas exhaust ducts 60 is secured to the end plate 51.

Referring to FIGS. 6A to 6D, FIG. 6A shows the lower side gas exhaust duct 60 that is arranged on the lower side of the battery pack 10 in FIG. 2. FIGS. 6B to 6D show the upper side gas exhaust duct 60 that is arranged on the upper side of the battery pack 10 in FIG. 2. The gas exhaust duct 60 has a rectangular pipe shape and an inside passage 64 is formed. As shown in FIG. 6A, on one surface (i.e. an upper surface) of four surfaces of the lower side gas exhaust duct 60, the gas inlet 62 communicating with the gas emission hole 42 is provided. The gas inlet 62 penetrates the upper surface of the lower side gas exhaust duct 60, namely, that the gas inlet 62 communicates with the inside passage 64. Likewise, the air intake 63 for taking in some cooling air flow 21 is provided on the upper surface of the lower side gas exhaust duct 60. This air intake 63 penetrates the upper surface of the lower side gas exhaust duct 60 and communicates with the inside passage 64. On the other hand, as for the upper side gas exhaust duct 60, as illustrated in FIGS. 6B to 6D, the gas inlet 62 communicating with the gas emission hole 42 is provided on a lower surface of the upper side gas exhaust duct 60. The gas inlet 62 penetrates the lower surface of the upper side gas exhaust duct 60, namely, that the gas inlet 62 communicates with the inside passage 64. The air intake 63 for taking in some cooling air flow 21 is provided on an upper surface of the upper side gas exhaust duct 60, which is opposite side to the lower surface where the gas inlet 62 is provided. The air intake 63 penetrates the upper surface of the upper side gas exhaust duct 60, and communicates with the inside passage 64.

The gas 61 released in the case 41 from the cell 30 is led into the inside passage 64 of the gas exhaust duct 60 through the gas inlet 62, while some cooling air flow 21 (a part of the cooling air flow 21) is taken in the inside passage 64 of the gas exhaust duct 60 through the air intake 63. In the present invention, twelve gas inlets 62, which is equal to the number of the battery modules 40, are provided. The gas inlets 62 and the air intakes 63 are arranged in alternate order along the longitudinal direction. Each of the air intakes 63 has a rectangular shape, and opens toward the cooling air flow passage 20. Each air intake 63 will be explained in more detail. Each air intake 63, namely the air intakes 63 provided on the upper side gas exhaust duct 60 arranged on an upstream side of the flow of the cooling air flow 21 and the air intakes 63 provided on the lower side gas exhaust duct 60 arranged on a downstream side of the flow of the cooling air flow 21, opens toward the upstream side along the flow direction of the cooling air flow 21.

Here, there is a case in which an interval between the gas emission holes 42 will shift or change in some degree when the battery modules 40 are arranged and secured in the arrangement direction S. In a structure in which a pipe is set to the each gas emission hole for releasing the gas, there is a possibility that the pipe will come off or become detached from the gas emission hole or a gap will appear between the pipe and the gas emission hole when pressurizing the plurality of the battery modules. In such cases, the gas leaks to the cooling air flow passage, and this might impair reliability of the battery pack.

On the other hand, in the present invention, the battery pack 10 employs the structure in which the outer surface of the gas exhaust duct 60 is contiguous to the flat outer surface of the case 41, and the gas emission hole 42 and the gas inlet 62 communicate with each other, then the gas 61 inside the case 41 is led into the gas exhaust duct 60. Furthermore, a size of the gas inlet 62 is formed to be greater than that of the gas emission hole 42. As a consequence, even if the interval between the gas emission holes 42 or the position of the gas emission hole 42 (or the gas inlet 62) shifts in some degree, the gas 61 can be exhausted out of the vehicle through the inside passage 64 of the gas exhaust duct 60 without causing the gas leakage to the cooling air flow passage 20. This results in high quality and high reliability of the battery pack 10. In addition, since the gas inlet 62 compensates for the some shift of the interval between the gas emission holes 42 or the some shift of the position of the gas emission hole 42 (or the gas inlet 62), it is not required to excessively enhance accuracy of dimensions when producing the gas exhaust duct 60, the case 41 and the frame 70 etc. or accuracy of a setting position of the gas emission hole 42. Control of the accuracy of dimensions can be then simplified, and this facilitates the production or processing of the parts.

Here, with respect to the gas inlet 62, it is preferable that the gas inlet 62 have a long hole or oval shape whose opening length along the arrangement direction S is longer than an opening length along a direction perpendicular to the arrangement direction S. The shift of the interval between the gas emission holes 42 occurs along the arrangement direction S of the battery modules 40, thus by forming the gas inlet 62 into the long hole shape, the gas inlet 62 can compensate for the some shift of the interval between the gas emission holes 42. Moreover, since the gas inlet 62 is enlarged only in a direction required for the compensation, the gas exhaust duct 60, which is present in the cooling air flow passage 20, does not become larger than is necessary. Hence, a projected area of the gas exhaust duct 60 on the cooling air flow passage 20 becomes relatively small, and an increase in pressure loss of the cooling air flow 21 due to the setting of the gas exhaust duct 60 can be prevented.

With regard to the gas exhaust duct 60, as shown in FIG. 6A, it is preferable that the gas exhaust duct 60 have a sealing portion 65 which encircles or surrounds a circumference of the gas inlet 62 and also encircles a circumference of the gas emission hole 42 by touching the outer surface of the case 41. The gas leakage to the cooling air flow passage 20 can be avoided by the sealing portion 65, and the reliability of the battery pack 10 is further increased.

Regarding the sealing portion 65, it is preferable that the sealing portion 65 be formed from an elastic member or material that is deformable when being pressed against the outer surface of the case 41. The gas leakage to the cooling air flow passage 20 can be further avoided by the elastic member, and the reliability of the battery pack 10 is even further increased. As the elastic material, for example, an elastically deformable material such as rubber-base material could be used.

The gas exhaust duct 60 penetrates the battery pack case 11 and comes out of the battery pack 10 (see FIGS. 1 and 2). An exhaust opening 60a of the gas exhaust duct 60 communicates with an outside space of the vehicle at a closest position to the battery pack 10. The gas exhaust passage formed by the gas exhaust duct 60 leads the gas 61, led through the gas inlet 62, and the part of the cooling air flow 21, taken in through the air intake 63, to the outside space, then exhausts them.

Material of the gas exhaust duct 60 is not limited as long as the material can resist the gas 61. The gas exhaust duct 60 could be formed, for instance, from resin material, elastic material such as rubber-base material, and these combined material. These materials bring about weight reduction of the gas exhaust duct 60. In addition, degree of freedom of the shape of the gas exhaust duct 60 increases, namely, that the gas exhaust duct 60 can be formed into any shape. Therefore, a proper layout of the gas exhaust duct 60 when installed in the battery pack 10 becomes possible. The above materials could be used for one part of the gas exhaust duct 60 and other materials (e.g. metallic materials) could be used for the other part.

FIG. 7 is the schematic view of the vehicle 80 in which the battery pack 10 shown in FIG. 1 is mounted.

The battery pack 10 mounted in the vehicle 80 such as a hybrid vehicle is used, for example, as a power supply for driving a driving motor. The battery pack 10 is mounted under a seat in the center of the vehicle 80, an interior space and a trunk of the vehicle are then widened. However, the place where the battery pack 10 is mounted is not limited to under the seat. The battery pack 10 can be mounted under the rear trunk or in an engine room in a vehicle front. The vehicle employing such battery pack 10 possesses high endurance, and allows a sufficient power output even after long-term use. Furthermore, the vehicle achieving high gas mileage and driving performance can be provided. The battery pack 10 can be widely used for an electric-powered vehicle and a fuel-cell vehicle besides the hybrid vehicle.

Next, the workings (operation) and effects of the present invention will be explained.

When using the battery pack 10, the air blower 16 is working. The cooling air flow 21 supplied through the air blower 16 flows into the battery pack case 11 via the inlet duct 14. The incoming cooling air flow 21 flows inside the cooling air flow passages 20 along the lateral direction of the battery module 40. Because the cooling air flow 21 flows along the outer surface of the case 41 of the battery module 40, the temperature of the battery is lowered, and deterioration in characteristics such as charging efficiency is prevented. The cooling air flow 21 after cooling down the battery modules 40 is led and exhausted out of the battery pack 10 through the outlet duct 15.

The gas exhaust duct 60 takes the some cooling air flow 21 (part of the cooling air flow 21) in the inside passage 64 through the air intake 63, and leads and exhausts the cooling air flow 21 to the outside space of the vehicle 80. In the gas exhaust passage formed by the gas exhaust duct 60, the air flow is produced.

When the gas 61 generated inside the cell 30 reaches the certain pressure, the valve member 34 releases the gas 61 from the cell 30 by opening the heat sealed part of the laminated films.

The gas 61 released inside the case 41 reaches the gas emission hole 42. The gas exhaust duct 60 takes the gas 61 in the inside passage 64 through the gas inlet 62, and leads and exhausts the gas 61 to the outside space of the vehicle 80 together with the part of cooling air flow 21 which causes the air flow. Since the air flow is already produced in the gas exhaust passage formed by the gas exhaust duct 60, the gas 61 does not stay or does not remain in the gas exhaust duct 60. Accordingly, even when the quantity of the gas 61 released from the cell 30 is small and its pressure is nearly zero, the battery pack of the present invention can ensure that this small quantity of the gas 61 is led and exhausted to the outside space of the vehicle 80. With this, the quality of the battery pack 10 is improved, and the reliability can be increased.

The size of the gas exhaust duct 60 becomes small as long as the gas exhaust duct 60 can take in the some cooling air flow 21 through the air intake 63, and the projected area of the gas exhaust duct 60 on the cooling air flow passage 20 becomes relatively small. Thus, the increase in pressure loss of the cooling air flow 21 due to the setting of the gas exhaust duct 60 can be prevented.

Since the gas exhaust duct 60 is contiguous to, or more specifically, touches the battery module unit 50 through the sealing portion 65 along the arrangement direction S, the gas exhaust duct 60 also functions to support or hold the each of the battery modules 40. Therefore, even if vibration or movement of the vehicle 80 is propagated to the battery module unit 50, the gas exhaust duct 60 absorbs or attenuates the vibration, it is then possible to protect the battery module unit 50 against the vibration.

As explained above, according to the present embodiment, by not only the pressure of the gas 61 itself which is released from the cell 30 but also the air flow that occurs due to part of the cooling air flow 21 taken in through the air intake 63 of the gas exhaust duct 60, the gas 61 can be exhausted via the gas exhaust passage. Consequently, the battery pack 10 with the high reliability can be provided by exhausting the gas even when the quantity of the gas 61 released from the cell 30 is small.

In the present invention, the air flow is produced in the gas exhaust passage by taking in the part of the cooling air flow 21 through the air intake 63. Accordingly, no additional passage, which provides the air flow in the gas exhaust passage, is required. Then the structure of the battery pack 10 does not become complicated.

Since the gas inlet 62 is formed into the long hole shape, the gas inlet 62 can compensate for the some shift of the interval between the gas emission holes 42, and the gas 61 can be exhausted out of the vehicle without causing the gas leakage to the cooling air flow passage 20. Quality and reliability of the battery pack 10 can be therefore increased. In addition, because the gas inlet 62 is enlarged only in the direction required for the compensation, the increase in pressure loss of the cooling air flow 21 due to the setting of the gas exhaust duct 60 can be prevented.

The gas exhaust duct 60 has the sealing portion 65. The gas leakage to the cooling air flow passage 20 can be avoided by the sealing portion 65, and the reliability of the battery pack 10 is further increased.

The sealing portion 65 is formed from the elastic member or material. The gas leakage to the cooling air flow passage 20 can be further avoided by the elastic member, and the reliability of the battery pack 10 is even further increased.

The case 41 is the metal case, thus ensuring required rigidity or solidity and contributing to size reduction and weight reduction of the battery module 40. In addition, it is possible to adequately resist temperature and pressure of the gas 61 released from the cell 30. Furthermore, the cooling performance of the battery can be improved.

The cell 30 employs the lithium-ion secondary cell, thus this results in size reduction of the battery pack 10 and space-saving, and is favorable for improvement of the performance of the battery pack 10, such as high power and long lifetime.

The vehicle employing the above battery pack 10 possesses high endurance, and allows the sufficient power output even after long-term use.

The present invention is not limited to the above embodiment, and it can be modified.

Figure 8:
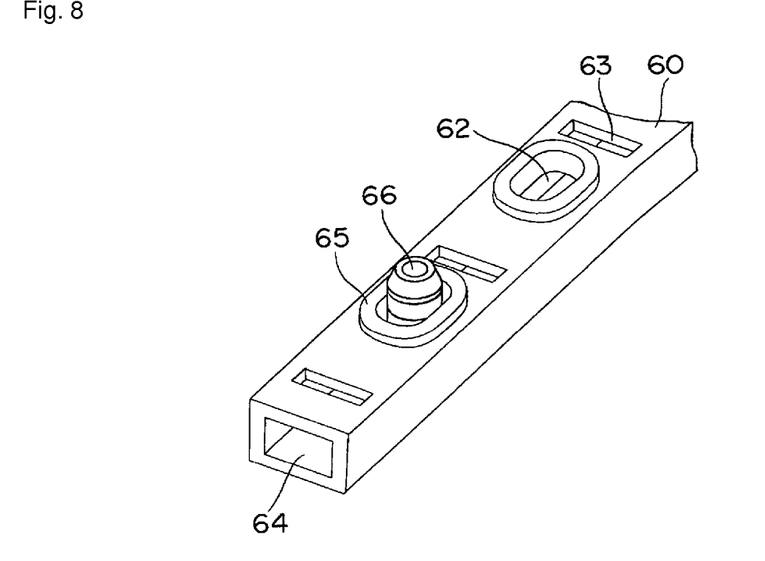
FIG. 8 is a perspective view of a main part of the gas exhaust duct according to a modification 1.

FIG. 8 is a perspective view of a main part of the gas exhaust duct 60 according to a modification 1.

With regard to the gas inlet 62 of the gas exhaust duct 60, it could have an attachable sensor 66 for detecting temperature of the cell 30. The sensor 66 is formed, for example, from a thermistor. A diameter of the thermistor 66 is set to be smaller than that of the gas inlet 62 in order not to hinder the gas 61 from being led into the gas exhaust duct 60. In addition, it is preferable that the thermistor 66 have such shape that its top end is inserted and stuck into the gas emission holes 42 of the case 41 then contacts or is close to the cell 30.

According to the modification 1, combining the sensor 66 with the gas exhaust duct 60 carries the advantage of installing the gas exhaust duct 60 and the sensor 66 at the same time. Furthermore, it is possible to use the inside passage 64 or the outer surface of the gas exhaust duct 60 as a route or duct for wiring of a signal wire connecting with the sensor 66.

Figure 9:
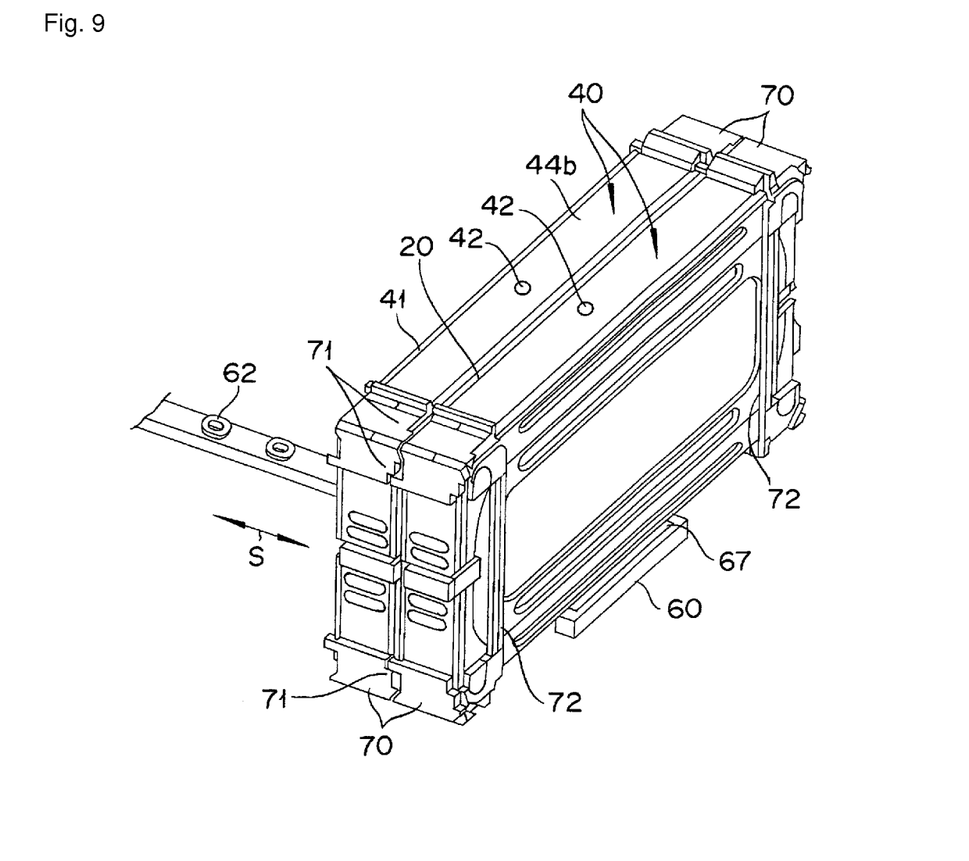
FIG. 9 is a perspective view of a main part of the gas exhaust duct according to a modification 2.

FIG. 9 is a perspective view of a main part of the gas exhaust duct 60 according to a modification 2.

In the above embodiments, the plurality of the air intakes 63 are provided in the gas exhaust duct 60. However, in the present invention, the gas exhaust duct 60 does not necessarily require the plurality of the air intakes 63. Regarding the number of the air intake 63, at least one air intake is provided in the gas exhaust duct 60 as long as the gas exhaust passage can take in the air which causes the air flow.

In this case, as shown in FIG. 9, an air intake 67 is provided in the gas exhaust duct 60, and it is preferable to provide the air intake 67 on a most upstream side of the air flow in the gas exhaust passage. With this, the gas 61 does not stay or does not remain in the gas exhaust duct 60, and the gas 61 can be exhausted to the outside space of the vehicle 80 by the air flow even when the gas 61 is taken in any gas inlet 62. Moreover, an opening area of the air intake 67 is set to be greater than that of one of the plurality of air intakes 63 so as to take in plenty of air for producing the sufficient air flow in the gas exhaust passage.

Figure 10:
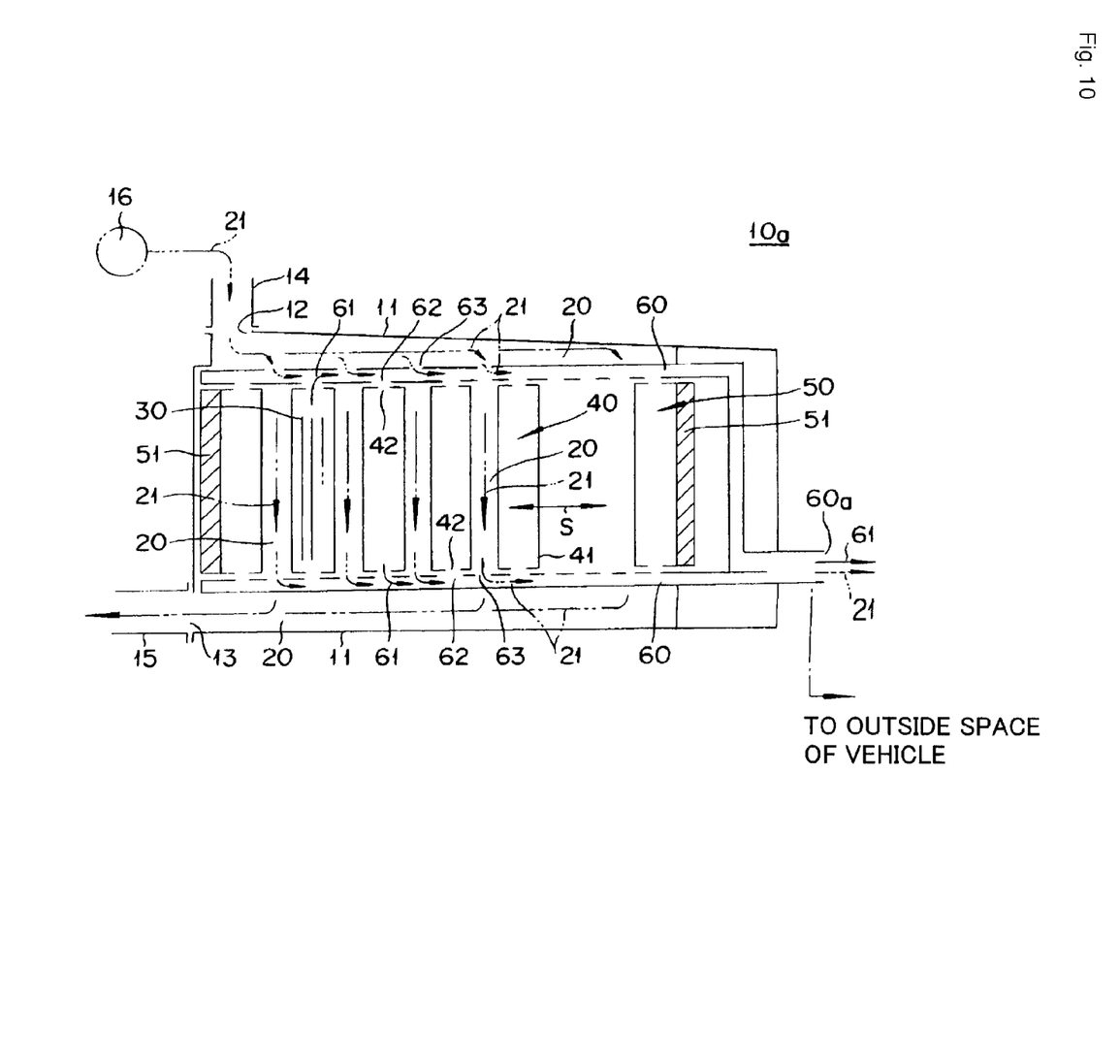
FIG. 10 is a drawing that schematically illustrates a flow of the cooling air flow inside a battery pack, according to a modification 3.

FIG. 10 is a drawing that schematically illustrates a flow of the cooling air flow 21 inside a battery pack 10a, according to a modification 3.

In the battery pack 10a of the modification 3, as can be seen in FIG. 10, with respect to the cooling air flow passage 20 on the upper side gas exhaust duct 60 side, its cross-sectional area of the air flow decreases with distance from the opening of the cooling air flow 21, i.e. from the inlet 12. More specifically, a space or distance between the upper surface of the battery pack case 11 and the upper side gas exhaust duct 60 decreases with distance from the inlet 12 to a right hand side in FIG. 10.

With this structure of the cooling air flow passage 20, a velocity of the air flow (or pressure) of the incoming cooling air flow 21 into the gas exhaust duct 60 becomes constant. Hence, the gas 61 does not stay or does not remain in the gas exhaust duct 60, and the battery pack can ensure that the gas 61 is effectively exhausted to the outside space of the vehicle 80 even when the gas 61 is taken in any gas inlet 62. Further, since the velocity of the cooling air flow 21 in the cooling air flow passage 20 becomes constant, cooling efficiency itself, which cooling down each of the plurality of the battery modules 40, becomes constant.

Figure 11A:
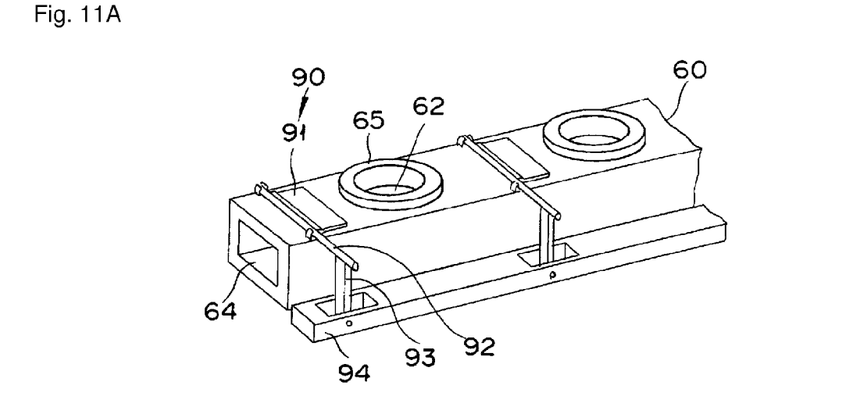
FIG. 11A is a drawing that shows a perspective view of the gas exhaust duct respectively, according to a modification 4.
Figure 11B:
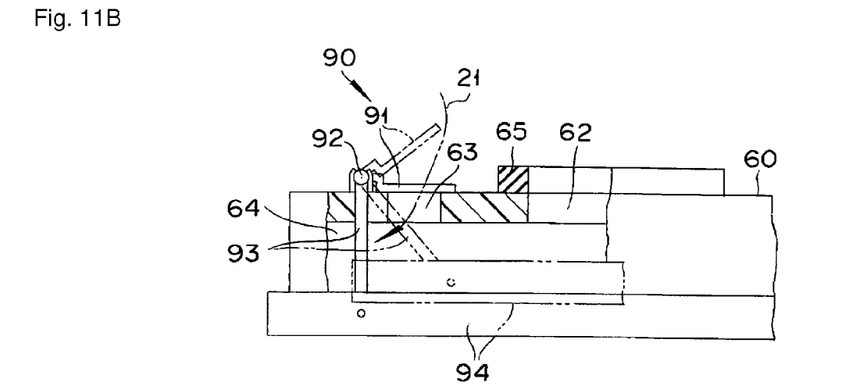
FIG. 11B is a drawing that shows a sectional view of the gas exhaust duct respectively, according to a modification 4.
Figure 12A:
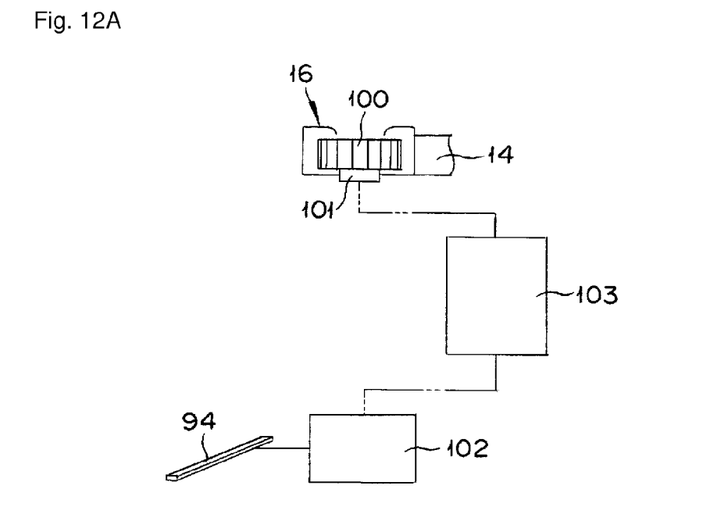
FIG. 12A is a schematic system diagram that shows a control system of the modification 4.
Figure 12B:
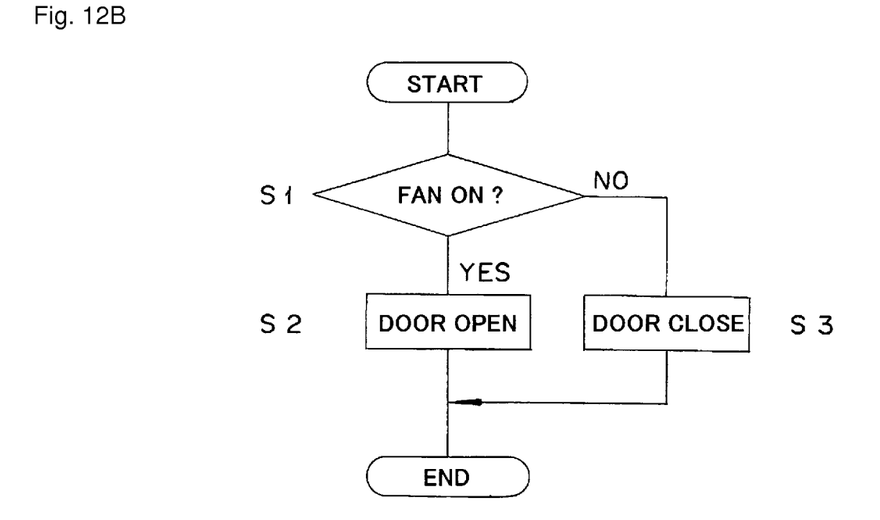
FIG. 12B is a flow chart that executes an operation in the modification 4.

FIGS. 11A and 11B are drawings that show a perspective view and a sectional view of the gas exhaust duct 60 respectively, according to a modification 4. FIG. 12A is a schematic system diagram that shows a control system of the modification 4. FIG. 12B is a flow chart that executes an operation in the modification 4.

In the above embodiments, although the air intake 63 is open all the time, the air intake 63 is not limited to this. That is, the gas exhaust duct 60 could be provided with a covering member 90 that opens/closes the air intake 63. The covering member 90 opens the air intake 63 when the cooling air flow 21 flows, while the covering member 90 closes the air intake 63 when the cooling air flow 21 does not flow.

Referring to FIG. 11A, the each covering member 90 has a door 91 formed from a resin or metal plate. The door 91 is fixed on the outer surface of the gas exhaust duct 60 to open/close the air intake 63. More specifically, the door 91 is rotatably fixed so that the door 91 revolves or turns about a rotation shaft (axis) 92. The rotation shaft 92 is connected to a bracket 94 through a connecting rod 93. One end of the connecting rod 93 is fixed to the rotation shaft 92, and the other end of the connecting rod 93 is rotatably connected with the bracket 94.

Referring to FIG. 11B, when the bracket 94 is placed in a position indicated by a solid line, as shown by a solid line, the door 91 is in a closed state (or position) that closes the air intake 63. On the other hand, as indicated by a two-dot chain line, when the bracket 94 shifts to a right direction in the drawing from the closed state, the connecting rod 93 revolves with respect to the bracket 94, and the rotation shaft 92 fixed to the connecting rod 93 is rotated. With this movement, as shown by a two-dot chain line, the door 91 is in an open state (or position) that opens the air intake 63.

Referring to FIG. 12A, the battery pack of the modification 4 has a motor 101 for driving a blower fan 100 of the air blower 16, an actuator 102 corresponding to a drive section which is connected to the door 91 and moves door 91 to bring the door 91 to the open or closed state, and a battery controller 103 corresponding to a control section which controls operations of the motor 101 and the actuator 102. The actuator 102 is formed, for example, from a solenoid and a motor etc. which are connected to the bracket 94. The battery controller 103 is formed mainly from a CPU and memories. The battery controller 103 controls the actuator 102 so that when the cooling air flow 21 flows, the door 91 is in the open state, and when the cooling air flow 21 does not flow, the door 91 is in the closed state.

Referring to the flow chart in FIG. 12B, the battery controller 103 turns on the blower fan 100 and works the air blower 16 when using the battery pack 10 (YES at step S1). At this time, the battery controller 103 operates and opens the door 91 by controlling the actuator 102 (at step S2). The cooling air flow 21 supplied by the air blower 16 flows into the battery pack case 11 through the inlet duct 14, and flows inside the cooling air flow passages 20. In this way, when the cooling air flow 21 flows, the gas exhaust duct 60 takes the cooling air flow 21 in the inside passage 64 through the air intake 63 that is opened by the door 91 of the open state. When the gas 61 is released in the case 41, the gas exhaust duct 60 takes the gas 61 in the inside passage 64 through the gas inlet 62, then actively leads and exhausts the gas 61 to the outside space of the vehicle 80 from the exhaust opening 60a together with the part of cooling air flow 21 which causes the air flow.

On the other hand, the battery controller 103 operates and closes the door 91 by controlling the actuator 102 (at step S3) when the blower fan 100 is turned off (NO at step S1) namely when the cooling air flow 21 does not flow. When the gas 61 is released in the case 41, the gas exhaust duct 60 takes the gas 61 in the inside passage 64 through the gas inlet 62. Since the air intake 63 is closed by the door 91 of the closed state, the gas exhaust duct 60 leads and exhausts the gas 61 to the outside space of the vehicle 80 from the exhaust opening 60a without leaking the gas 61 to the cooling air flow passages 20.

In this way, the door 91 as the covering member 90 is in the open state when the cooling air flow 21 flows, and the door 91 is in the closed state when the cooling air flow 21 does not flow. As a consequence, during the open state, it is possible to leads the cooling air flow 21 into the gas exhaust duct 60 and to actively exhaust the gas 61 to the outside space of the vehicle 80. On the other hand, during the closed state, it is possible to prevent the gas 61 taken in the gas exhaust duct 60 from leaking to the cooling air flow passage 20.

The battery pack has the actuator 102 that moves the door 91 and brings the door 91 to the open or closed state and has the battery controller 103 that controls the actuator 102 so that when the cooling air flow 21 flows, the door 91 is in the open state, and when the cooling air flow 21 does not flow, the door 91 is in the closed state. It is therefore possible to change the open and closed states of the door 91 in synchronization with ON and OFF of the blower fan 100 supplying the cooling air flow 21. Consequently, the battery pack can ensure the active exhaust of the gas 61 to the outside space of the vehicle when the cooling air flow 21 flows and the prevention of the leakage of the gas 61 to the cooling air flow passage 20 when the cooling air flow 21 does not flow.

Figure 13A:
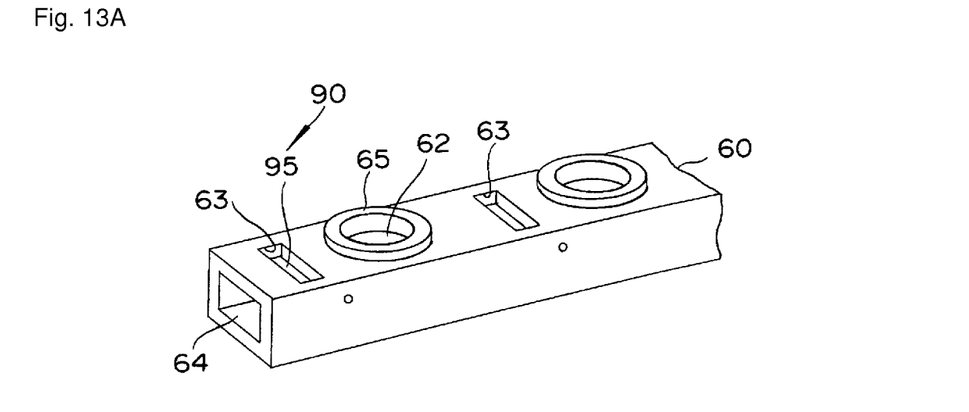
FIG. 13A is a drawing that shows a perspective view of the gas exhaust duct respectively, according to a modification 5.
Figure 13B:
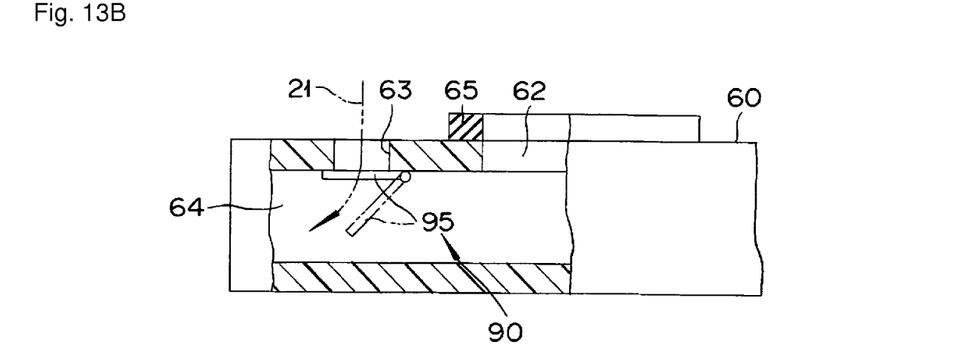
FIG. 13B is a drawing that shows a sectional view of the gas exhaust duct respectively, according to a modification 5.

FIGS. 13A and 13B are drawings that show a perspective view and a sectional view of the gas exhaust duct 60 respectively, according to a modification 5.

The gas exhaust duct 60 according to the modification 5 has a covering member 90 that opens/closes the air intake 63, same as the modification 4. The covering member 90 is in the open state that opens the air intake 63 when the cooling air flow 21 flows, while the covering member 90 is in the closed state that closes the air intake 63 when the cooling air flow 21 does not flow. However, unlike the modification 4, the battery pack of the modification 5 has no actuator and no battery controller. This point is different from the modification 4.

Referring to FIGS. 13A and 13B, in the modification 5, the covering member 90 is provided at the gas exhaust duct 60, and has a so-called one-way valve by which the covering member 90 opens inward and is in the open state by a wind pressure of the cooling air flow 21. More specifically, the covering member 90 has a door 95 that automatically moves or swings so that the air intake 63 is opened by the wind pressure of the cooling air flow 21 when the cooling air flow 21 flows and the air intake 63 is closed when the cooling air flow 21 does not flow. The door 95 is installed on an inner surface of the gas exhaust duct 60 to open/close the air intake 63. In FIG. 13B, the door 95 of the closed state is shown by a solid line, and the door 95 of the open state is shown by a two-dot chain line.

In order that the door 95 can work even a low wind pressure or low quantity of the cooling air flow 21, the door 95 could be formed from a resin plate or a film. In a case where the door 95 is formed from the plate and a rotation shaft is provided, a spring member that biases the door 95 in a direction of the closed state by its resilient force is provided in the rotation shaft. Then when the cooling air flow 21 flows, the door 95 automatically swings and opens the air intake 63 by the wind pressure of the cooling air flow 21 against the resilient force of the spring member. When the flow of the cooling air flow 21 stops, the door 95 automatically closes the air intake 63 by the resilient force of the spring member. On the other hand, in a case where the door 95 is formed from the film, one side or edge of the film is fixed on the inner surface of the gas exhaust duct 60. Then when the cooling air flow 21 flows, the door 95 automatically opens the air intake 63 by the wind pressure of the cooling air flow 21. When the flow of the cooling air flow 21 stops, the door 95 automatically closes the air intake 63 by returning properties of the warped film itself.

In this way, same as the modification 4, the door 95 as the covering member 90 is in the open state when the cooling air flow 21 flows, and the door 91 is in the closed state when the cooling air flow 21 does not flow. As a consequence, during the open state, it is possible to leads the cooling air flow 21 into the gas exhaust duct 60 and to actively exhaust the gas 61 to the outside space of the vehicle 80. On the other hand, during the closed state, it is possible to prevent the gas 61 taken in the gas exhaust duct 60 from leaking to the cooling air flow passage 20.

The door 95 is automatically moved or warped by the wind pressure of the cooling air flow 21 and automatically returns to the closed state. Thus, a structure of the door becomes considerably simpler. And with this door structure, the battery pack can ensure the active exhaust of the gas 61 to the outside space of the vehicle when the cooling air flow 21 flows and the prevention of the leakage of the gas 61 to the cooling air flow passage 20 when the cooling air flow 21 does not flow.

Since the door 95 opens in the same direction as the flow of the cooling air flow 21 (i.e. in a downward direction in FIG. 13B), the pressure loss of the cooling air flow 21 when taken in the gas exhaust duct 60 through the air intake 63 can be reduced. Furthermore, a relationship between the quantity of the cooling air flow 21 led into the gas exhaust duct 60 and an opening of the door 95 can be obtained, an optimum design of the gas exhaust duct 60 is therefore possible for the gas exhaust.

Regarding the covering member, it is not limited to the doors 91 and 95 shown in the modifications 4 and 5. Shape, material, installation position and working motion of the covering member could be changed as long as the covering member can open/close the air intake 63. For instance, a slide door which slides to open/close the air intake 63 could be installed on an inner or outer side of the gas exhaust duct.

This application is based on a prior Japanese Patent Application No. 2008-104684 filed on Apr. 14, 2008, and a prior Japanese Patent Application No. 2009-048492 filed on Mar. 2, 2009. The entire contents of these Japanese Patent Applications Nos. 2008-104684 and 2009-048492 are hereby incorporated by reference.

The invention claimed is:

1. A battery pack comprising:
   a battery module unit having a plurality of battery modules, each of the battery modules having a cell which is housed in a case and provided with a valve member for releasing gas generated in the cell into an inside of the case;
   a cooling air flow passage which is formed along an outer surface of the case of the battery module and in which a cooling air flow flows; and
   a gas exhaust duct forming a gas exhaust passage which extends in an arrangement direction of the plurality of the battery modules while the gas exhaust duct being contiguous to the battery module unit for exhausting the gas released in the case from the battery modules, and
   the gas exhaust duct having
   (a) a gas inlet for leading the gas released in the case into the gas exhaust duct, the gas inlet communicating with a gas emission hole that is provided in each case to emit the gas; and
   (b) at least one air intake for taking in the cooling air flow of the cooling air flow passage; and
   (c) a covering member that selectively opens the air intake when the cooling air flow flows, and selectively closes the air intake when the cooling air flow stops to control introduction of the cooling air flow into the exhaust duct.

2. The battery pack as claimed in claim 1, wherein the air intake of the gas exhaust duct opens toward the cooling air flow passage and takes in part of the cooling air flow.

3. The battery pack as claimed in claim 1, wherein the plurality of battery modules are arranged and secured in the arrangement direction, and the gas inlet of the gas exhaust duct has a long hole shape whose opening length along the arrangement direction is longer than an opening length along a direction perpendicular to the arrangement direction.

4. The battery pack as claimed in claim 1, wherein the gas exhaust duct has a sealing portion which encircles a circumference of the gas inlet and also encircles a circumference of the gas emission hole by touching the outer surface of the case.

5. The battery pack as claimed in claim 4, wherein the sealing portion is formed from an elastic material that is deformable when being pressed against the outer surface of the case.

6. The battery pack as claimed in claim 1, wherein the gas inlet of the gas exhaust duct has an attachable sensor for detecting temperature of the cell.

7. The battery pack as claimed in claim 1, wherein the air intake of the gas exhaust duct is placed on an upstream side of the air flow in the gas exhaust passage.

8. The battery pack as claimed in claim 1, wherein an air flow cross-sectional area of the cooling air flow passage located on an inlet side of the cooling air flow decreases with distance from the inlet.

9. The battery pack as claimed in claim 1, further comprising:
   a drive section which is connected to the covering member and drives the covering member to an open or closed position; and
   a control section which controls an operation of the drive section so that when the cooling air flow flows, the covering member is set to the open position, and when the cooling air flow stops, the covering member is set to the closed position.

10. The battery pack as claimed in claim 1, wherein the covering member is installed at the air intake of the gas exhaust duct so that the covering member opens inward by wind pressure of the cooling air flow.

11. The battery pack as claimed in claim 1, wherein each case of the battery modules is a metal case.

12. The battery pack as claimed in claim 1, wherein the cell employs a lithium-ion secondary cell.

13. A vehicle comprising the battery pack according to claim 1.

* * * * *